(12) United States Patent
Bolton (10) Patent No.: US 12,134,570 B2
(45) Date of Patent: Nov. 5, 2024

(54) ARRANGEMENT FOR TREATING WASTEWATER

(71) Applicant: Dan Bolton, Brownwood, TX (US)

(72) Inventor: Dan Bolton, Brownwood, TX (US)

( * ) Notice: Subject to any disclaimer, the term of this patent is extended or adjusted under 35 U.S.C. 154(b) by 209 days.

(21) Appl. No.: 17/488,570

(22) Filed: Sep. 29, 2021

(65) Prior Publication Data

US 2022/0098057 A1 Mar. 31, 2022

Related U.S. Application Data

(60) Provisional application No. 63/085,723, filed on Sep. 30, 2020.

(51) Int. Cl.
*C02F 1/00* (2023.01)
*C02F 1/04* (2023.01)
*C02F 1/68* (2023.01)

(52) U.S. Cl.
CPC ............. *C02F 1/008* (2013.01); *C02F 1/048* (2013.01); *C02F 1/686* (2013.01); *C02F 2209/01* (2013.01); *C02F 2209/02* (2013.01); *C02F 2209/05* (2013.01); *C02F 2209/09* (2013.01); *C02F 2209/42* (2013.01)

(58) Field of Classification Search
None
See application file for complete search history.

(56) References Cited

U.S. PATENT DOCUMENTS

| | | | |
|---|---|---|---|
| 2005/0103630 A1* | 5/2005 | Ganzi | C02F 1/469 204/632 |
| 2019/0352194 A1* | 11/2019 | Thiers | B08B 3/08 |

\* cited by examiner

*Primary Examiner* — Hayden Brewster
(74) *Attorney, Agent, or Firm* — Alan Carlson (57) ABSTRACT

A system and method for evaporative treatment or wastewater which minimizes scaling and system maintenance is disclosed. The apparatus can include an evaporation vessel with a heating source to evaporate water from a solution under treatment and a drain valve for draining the solution after treatment. The apparatus can also include one or more sensors configured to measure parameters of a solution under treatment and a user programmable controller to control the treatment process based on such measurements. A user can configure the controller to define the detection of a solution's critical state where contaminant concentrations are maximized yet scaling is minimized. When a critical state of the solution is reached a portion of the treated solution can be removed and the vessel refill with new wastewater thereby lowering the concentration of the remaining solution the repealing the evaporation and drain cycle until all wastewater has been treated.

9 Claims, 2 Drawing Sheets

ARRANGEMENT FOR TREATING WASTEWATER

FIELD OF THE INVENTION

The present disclosure is related to the Held of wastewater treatment and more particularly to wastewater treatment systems and methods that minimize chemical build up and/or scaling withing such wastewater treatment systems.

BACKGROUND

Many industrial processes generate wastewater that contains heavy metals and other hazardous compounds and chemicals. Most citizens can appreciate that proper disposal of industrial wastewater is a serious concern to ensure that our environment does not get polluted with hazardous wastes. In developed countries there is an ever-increasing societal concern to control pollution as is evidenced by continually tighter environmental regulations imposed by government entities. Generally, commercial entities that dispose of wastewater via a municipal system must have their wastewater analyzed to determine if contaminant levels exceed the legal limits imposed by the municipal treatment facility. Likewise, most jurisdictions require all emissions from commercial site, such as smokestack vapor to be analyzed to determine if any harmful contaminates (solids and chemicals) exceed defined limits.

It can be appreciated that most if not all landfills, petroleum producers, food producers, and manufacturing industries such as the semiconductor, metal processing, petrochemical, and the paper industry generate and thus have to dispose of wastewater having contaminants that exceed limits as established by municipal treatment facilities. In the early 70's the US government enacted the Clean Water Act and correspondingly policies such as the National Pollution Discharge Elimination System (NPDES) and "zero liquid discharge" regulations required public waste treatment facilities to implement rigorous operating policies and procedures. The implementation of such policies and procedures spawned significant development in wastewater treatment technologies where such wastewater was previously directly discharged into ditches or waterways.

It can be appreciated that, nearly every business that manufactures metal products such as wire, pipe, sheet metal, bearings, and/or builds or rebuilds machinery uses water to cool metal forming equipment and/or cutting tools where heavy metals get mixed in with cooling water. Although such cooling water can be used for a long period of time via recycling methods, eventually such water which includes heavy metals (i.e., copper, nickel, beryllium lead, arsenic, etc.) will need disposal.

In addition, wastewater generated by industry often has high concentrations of salts. Such a wastewater is often referred to as a brine which can be concentrated for easier disposal. When a brine solution gets concentrated by a wastewater treatment system a semiliquid mixture of fine particles and chemical compositions results which it is often referred to as a slurry. Most commercial operations that generate contaminate levels in excess of defined discharge limits will have an onsite wastewater processing system to treat such wastewater before it flow's into a municipal treatment facility. Failing to properly treat and or dispose of contaminated wastewater can cause substantial economic loss including substantial fines and costly clean up or remediation and can also hurt a company's reputation. Most municipal wastewater disposal plants in the U.S. only allow extremely small concentration of certain chemicals to be present in incoming wastewater to ensure that the municipality remains in compliance with federal regulations. It can be appreciated that discharge of even small trace amounts of certain chemicals such as arsenic are strictly prohibited by most public wastewater regulations. Leachate water generated by solid waste landfills is another water pollution concern. It can be appreciated that nearly every type of metal, chemical and/or contamination can end up in a landfill via batteries pesticides etc., where storm water runoff from a landfill will often have contaminant concentrations that exceed acceptable limits.

One way to properly dispose of such contaminated water is to use an evaporation type wastewater treatment system to condense the solids into a thick slurry then further dry the slurry to create solid waste for proper disposal. Accordingly, evaporative water treatment systems can process water with a wide variety of contaminants such as metals and salts, but during the evaporation, process contaminants precipitate and grow or cause scaling on internal surfaces often forming hard to break bonds to such surfaces. Uncontrolled scaling often occurs when a solution under treatment has high levels of minerals like calcium carbonate, and salts like sodium chloride. The buildup of solids within a typical treatment system eventually degrades system performance by coating heat exchangers, sensors, and valve components where ultimately buildup will make such systems inoperable by fouling sensors, clogging passageways, and interfering with the operation of valves and other components.

Many evaporative treatment systems are dual cycle systems, initially conducting a heating/evaporation cycle by pumping wastewater by a heat exchanger, then conducting a precipitation/settling cycle where the wastewater is undisturbed to foster settling and precipitation. Systems that periodically pause the evaporation process to enhance precipitation and settling, by design cause significant sealing on interior surfaces where such scaling and build up is nearly always very difficult to remove making such systems overcomplicated, unreliable and inefficient, with very high operational costs.

Other evaporative wastewater systems utilize evaporation zones/tanks and quiescent solids-settling zones/tanks, where the settling zone enhances precipitation rates by keeping the wastewater stagnant. Although dual zone systems allow for simultaneous evaporating, and solid settling, these systems are inefficient and less than perfect in many areas, for example, such systems still do not have effective measures to control scaling in each zone. Further, such systems are very inefficient particularly when the incoming wastewater has a low percentage of solids as long evaporation periods are necessary to process a single batch of wastewater.

In both system types, scaling can eventually block passageways and can coat important components and generally degrade the operation and functionality of active components. More specifically, scale build up on a heat exchanger, sensor, a seat, plug or stem of a valve and/or on the impeller of a pump can seriously hinder and impede system operations leading to failure. It is well known that a significant problem with current evaporative systems is that removal of the solids that have built up withing the system is a difficult and expensive process. For example, as a brine thickens as part of the evaporation process salts often rapidly crystalize and adhere to and grow on critical surfaces. Such debilitating formations are most likely associated with heat exchangers and moving parts or other critical components required to efficiently control system operations. As stated above, such build up can cause many problems such as inefficient operation due to obstruction of valves and conduits and the coating/insulating of heat exchangers all which, for example can cause operational control, heating inefficiencies, flow control and capacity reduction for such systems.

When the wastewater under treatment achieves a significant salt content (a brine) it becomes very corrosive such that most metals it contacts even aluminum alloys can sustain a debilitating attack. To make treatment systems more reliable many fabricators utilized titanium because it is resistant to attachment, and attack from a broad array of corrosive constituents of wastewater however, this makes such systems very expensive and thus less than a perfect solution to such problems.

A high concentration brine has a high boiling point and thus is often processed using higher temperatures. At such high temperatures the brine can undergo hydrolysis and release hydrochloric acid which aggressively attacks steel and other metals. The higher the temperature, the higher the rate of hydrolysis, so evaporator vessels and particularly heat source surfaces w ill eventually erode away making a rough surface for which strong crystal bonding and/or attachment can occur. Thus, some manufacturers utilize very expensive noble alloys, such as palladium-alloyed titanium and high nickel-chrome-molybdenum alloys all which significantly increase the cost to build such systems again making them less than perfect.

Based on the forgoing it can be appreciated that current state of the art wastewater disposal systems are less than perfect and have many shortcomings. It would therefore be desirable to have a wastewater treatment system that overcomes the above deficiencies and countless other limitations that are inherent in current state of the art treatment systems. What is needed is a low cost, low maintenance, robust wastewater treatment system which can efficiently and reliably treat wastewater to achieve proper disposal.

BRIEF DESCRIPTION OF THE DRAWINGS

Aspects of the disclosed embodiments will become apparent upon reading the following detailed description and upon reference to the accompanying drawings in which, like references may indicate similar elements.

SUMMARY OF THE INVENTION

An apparatus for treating a wastewater solution is disclosed. The apparatus can include a first vessel having an inlet valve from which the vessel can be filled with incoming wastewater to be treated. The first vessel can include a heating source configured to heat the solution to temperatures sufficient to evaporate water from the solution and an outlet valve for draining the solution after sufficient treatment is achieved. The apparatus can include one or more sensors configured to measure parameters of the solution and to communicate such measurements to a process controller. The controller cart be user configured to process the data in detecting when the solution has reached a critical state and/or when the solution is close to or has reached its solubility point such that the system can avoid uncontrolled scaling.

Setting, defining, and detecting when the solution has reached its critical state, can include defining what sensor data dictates that the solute in the solution has reached a solubility level occurring just prior to appreciable scaling and/or the existence or growth of solids on critical interior system surfaces. A user can program controller operations regarding what data values or combination of data values from one or more sensors define when the solution has reached a critical state. When a critical state is detected, the controller can open an outlet valve and drain a predetermined amount of treated solution from the system. Then, the controller can close the outlet valve mid open the inlet valve to add untreated solution to the remaining or undrained solution and mix the contents thereby diluting the remaining solution and changing the concentration levels of the solution under treatment such that the solution will no longer be at a critical state. After the refill is complete, the controller can repeat the treatment process on the new batch of solution and each successive batch until all a desired amount of wastewater has been treated.

The disclosed arrangements allow an operator of a treatment system to define one or a set of wastewater processing control parameters that can predict, and incrementally control aspects of the process based on the prediction, then accurately identify when a solution actually reaches a user defined critical state. Such a critical state can be related to a solubility point and/or when the solution has reached conditions indicating that additional changes such as the removal of additional water from the solution will cause appreciable scaling on critical surfaces within the treatment vessel. After such parameters are defined, the treatment method can include filling an evaporative and settling vessel of a treatment system with wastewater solution, them evaporating water from the solution by heating the solution to user-controlled temperatures. As the solution is being heated, parameters of the solution such as solution temperature, pH, viscosity, and flow rate can be monitored as part of determining when the solution has achieved a critical state. When the solution reaches a critical state, the controller can actuate a drain valve in the settlement vessel and/or the evaporator vessel to drain at least a portion of the treated solution from the system. Then, untreated solution with a lower solute level can be added to the remaining/undrained solution to dilute the undrained solution changing its state to a non-critical state such that the solution under treatment is no longer at one of more critical states. The new batch can be mixed and heated until it reaches one or more critical states, and then the drain/refill/heat process can be repeated until all of the wastewater has been treated.

In some embodiments the incoming solution can be pretreated for example with an agent to increase the percentage of solute that the solution will suspend or hold or alternately how much solute will remain in the solution when the solution is in a critical state. In some embodiments, aggressive agitation can be implemented to increase the percentage of solute the solution will suspend in a critical state. Further, a wetting agent can be applied to one or more interior surfaces using spray nozzles to substantially eliminate dry surfaces thereby reducing scaling on such surfaces. Yet further, splashing of the solution under treatment due to excess bubbling and solution velocities can be monitored, controlled, and substantially eliminated by reducing solution temperature, pump speeds, or controlling other process parameters that cause or have an effect on excess solution splashing to further reduce scaling on interior surfaces.

In yet another embodiment a wastewater treatment system is disclosed that includes an evaporator vessel to contain a solution under treatment and a dilution vessel in fluid communication with the evaporator vessel. The evaporator vessel can have a heat source that is at least partially contained within the evaporator vessel. The evaporator vessel can have an exhaust port such that gasses and vapor can exit the system. A circulation pump can move the solution past the heat source, between the evaporator vessel and the dilution vessel and through agitation baffles. The system can include a controller in communication with sensors to detect properties and attributes of the solution, and in communication with a heat source and a circulation pump. The sensor can provide data to the controller such that the controller can determine if the solution is reaching or has reached a critical state.

Such a critical solution state can be defined by an operator as a state occurring just prior to a state where significant scaling will likely occur within the system. Such a state can be user defined as a state where the solution is at or near its solubility point or other selectable factors such as the amount of, or rate of precipitation that the system can endure without degrading future system performance. When the critical state is detected, the controller can activate one or more valves to discharge a predetermined amount of treated solution and to activate one or more valves to add untreated solution to the system thereby creating a new solution which is below the previously reached critical state.

The new diluted solution can be mixed, agitated, heated, and processed until it reaches a critical state, and the system can continue executing the fill/heat/drain cycles until all wastewater has been processed. In some embodiments a spray system can be located within the evaporator vessel to ensure that all interior surfaces (particularly those of and proximate to the heat source) remain wet during solution processing. In some embodiments a second sensor can be included that detects splashing of the solution wherein the controller can be configured to reduce or minimize the splashing of the solution within the system.

DETAILED DESCRIPTION OF EMBODIMENTS

The following is a detailed description of embodiments of the disclosure depicted in the accompanying drawings. The embodiments are described in such detail as to clearly communicate the essence of the new and novel improvements to the art. However, the amount of detail offered is not intended to limit the anticipated variations to what has been disclosed. The description that follows is for purposes of explanation and not limitation, as specific details are set forth including particular structures, architectures, interfaces, timing, techniques, etc. to provide a thorough understanding of the various aspects and features of what has been invented. However, it will be apparent to those skilled in the art having the benefit of the present disclosure that the various aspects of the disclosure may be practiced in ways and versions that depart from the details specified herein. In certain instances, descriptions of known apparatuses, systems and methods are omitted so as not to obscure the explanation, teaching and description of the claimed embodiments with unnecessary detail. The teachings herein are intended to cover all modifications, equivalents, and alternatives falling within the spirit and scope of the invention as defined by the appended claims.

The process to dispose of contaminated water is highly regulated and can be an expensive process as evidenced by the amount of attention and detail that has been given to discharge regulations, to disposal systems and processes and the strict laws covering the transportation and safe disposal of industrial and hazardous waste. As stated above current state of the art wastewater treatment systems are expensive to purchase and operate, have limited lifetimes and require extensive maintenance to ensure proper ongoing operation and compliance. The novel improvements disclosed herein allow for reduced build costs, operational costs, and maintenance costs for wastewater treatment systems. Such disclosed improvements to the art include advances that are particularly valuable for nearing wastewater containing one or more types of salt.

Although many are familiar with sodium chloride (i.e., table salt or road salt), in the field of chemistry the term salt often refers to a broad group of ionic compounds which generally consist of two groups of oppositely charges ions. The positively charged ions are called cations (from a base) and negatively charged ions called anions (from an acid) and these chemical groups generally combine to form a salt with typically has an overall electrical charge of zero. The positive ions typically originate from a metal element and the negative ions typically originate from a non-metal element. Hydrolysis of salt refers to the reaction of sail with water. When salt is added to water, they react where water provides the negative ions. In hydrolysis, salt compounds (metal and non-metal) completely or partially separate or dissociate to form ions, depending upon the solubility product of the particular salt. Most ionic compounds exhibit significant solubility in water or other polar solvents.

Regarding the hydrolysis of a salt (becoming a solute) in water, the resulting salt concentration in the solution can be categorized in three basic categories: unsaturated, saturated, and supersaturated. A saturated solution contains a maximum amount of solute that can be dissolve in the water at a given temperature and pressure where any further addition of solute cannot find matching negative ions and where the undissolved solute will typically fall to the bottom of a container as an undissolved solid. An unsaturated solution has less than an amount of solute than required to reach the "point of saturation" where a solute concentration that is beyond the point of saturation will cause the salute to precipitate or crystallize under most conditions. A supersaturated solution contains more than the maximum amount of solute that can be dissolved at a given temperature generally making the solution unstable. When a solution is unstable the solute will usually begin to crystallize, especially if disturbed in some form or manner. Another factor effecting crystallization is to add a seed crystal to a supersaturated solution, wherein solute particles being attracted to the seed will leave the solution and form a crystalline precipitate. Because the solubility of most solids increases with increasing temperature, a saturated solution that was prepared at a higher temperature usually contains more dissolved solute than it would contain at a lower temperature and as such a solution cools it becomes super saturated.

For example, a brine having a concentration under 28.1% by weight (well below saturation point) at atmospheric pressure generally has the same boiling point as pure water (100° C.). However, the boiling point of a solution will rise as it achieves higher salt concentrations. When a solution at or near it's saturation point is sufficiently cooled, it will enter a supersaturated state where adding a small particle of the solute, a seed crystal, will cause the excess solute to rapidly precipitate or crystallize. Different solutions such as brines can have much different saturation points based on their pH levels, temperature, pressure, and agitation provided.

Parameters and phenomena that determine the solubility of a substance in a solution under treatment often largely depends on the chemical nature of the solute (such as whether it is ionic or molecular) rather than on its physical state (solid, liquid, or gas). The solubility of ionic compounds is largely determined by the dielectric constant ($\varepsilon$) of the solvent, which is a metric of its ability to affect or decrease the electrostatic forces between charged particles. The degree of saturation denotes the actual relationship between the weight of moisture existing in a space and the weight that would exist if the space were saturated.

As stated above, many evaporative type wastewater treatment systems can process brines or solutions containing salts but suffer from not being able to effectively determine, detect and control the precipitation of salts and their bonding action to interior surfaces and thus are unable adequately control such phenomena thus minimize the effects of gassing, scaling, fouling and corrosion on such surfaces. Such scaling, solid buildup, gas emission, and resulting corrosion escalates when a salt-based solution under treatment becomes hot and supersaturated, and/or when the solution achieves maximum salt concentration levels thereby creating destruction to system components. Accurately predicting and tightly controlling scaling withing a system tan be very difficult as saturation levels and/or precipitation points depend on many interrelated ever-changing factors such as viscosity, pressure, temperature, solution agitation, pH, fluid composition, salt type, salt concentration levels etc.

In accordance with the evaporative wastewater treatment embodiments disclosed herein operations are conducted below temperatures that would vaporizes most contaminants and thus emitting contaminants via exhaust vapor is not of significant concern. Although emission limits are well defined, vapor emission tests conducted on water vapor emitted from operations of the disclosed apparatus could not detect even trace amounts of any such contaminants.

During the evaporation process the disclose system can detect and predict when an undesirable amount, of scaling is about to occur, possibly when solution-based solids are going to begin adhering to surfaces in such a manner that could eventually threaten system efficiently and performance. When this critical solution state is detected, the system can lower the effective concentration of the solution under treatment by draining off a portion of the "treated" solution, and "replacing" the amount drained solution with a new batch of wastewater, to dilute and reduce the concentrations of the solution when such threat is impending. Since the replacement or new incoming wastewater has much lower concentrations of suspended solids than the "treated" solution remaining in the system, after this drain/refill cycle the solution undertreatment will have a concentration well below the critical solution state. Alternately stated, after the undrained/remaining solution under treatment mixed with and thereby diluted with a new batch of wastewater, concentrations of the solution under treatment will fall well below the critical state as detected or determined by a controller.

Such batch processing can effectively control and substantially eliminate the formation of most, if not all menacing salt crystallization on interior system surfaces despite large concentrations of salts being present in the influent or incoming wastewater. When properly configured, the disclosed batch processing design will provide many years of trouble-free service in efficiently treating wastewater from industrial, commercial, or municipal sources. Thus, the disclosed system can be configured to minimize system maintenance and system failures allowing for long periods of continuous operation with minimal downtime. Being it understood that the disclosed system will less frequently required maintenance and periodic deep cleanings where the system can be washed out and flushed with a solvent such as an acid to remove any build up that has occurred, (if or when needed).

Regarding the predicting and detecting of a solution's critical state and correspondingly the minimization of system scaling and fouling, the system can control many factors that affect the saturation/solubility point of a solution. Generally, as the temperature, pH and make-up of the solution increases the solubility and/or the saturation point of the solution and this the critical state can increase. The defined critical state is also dictated by the movement, velocity, agitating, stirring and/or mixing of the solution under treatment. Even minimal agitation of a solution under treatment will disrupt, slow and and/or prevent precipitation, scaling, and the ability of a solids such as crystals to form tight bonds on internal system surfaces.

The disclosed system provides major improvements over prior systems in scaling control which leads to fouling of components and mechanical systems in wastewater treatment systems. For example, the geometry of the disclosed embodiments minimizes areas where the solution can remain stagnant or be subjected to low velocity zones and flow discontinuities. Such stagnation phenomenon can often contribute to excessive scaling or fouling in areas of an evaporation vessel. The disclosed embodiments provide a continuous homogeneous solution flow in an evaporation vessel to increase saturation points and keep the solution below a "normal" saturation point to avoid costly scaling, corrosion and pitting from the generation of acids caused by out gassing and the precipitation of the solute.

Although the terms precipitation and crystallization are both used to describe the separation of a solid or solid solute from a solution, precipitation includes the amassing of both crystalline structures (well defined lattice structure) and non-crystalline structures (particles attached in a random configuration).

Operation of the disclosed system can include initially acquiring sensor data on incoming wastewater parameters, and processing parameter data to generate a tailored treatment process. The tailored process can monitor parameters of the solution under treatment by the system using sensors such as a temperature, pressure, solute levels, concentrations level, saturation point, evaporation rate, pH, viscosity, precipitation rate, density, turbidity, fluid velocity, specific gravity, relative density, conductivity, splashing and circulation pump parameters such as power consumption and impeller speed of the pump.

For example, as the system evaporates water from the solution the solution will reach a critical state prior to or near saturation where conditions are prime for the separation of solids via precipitation and crystallization. Before or when such a critical solution state is determined, as defined by an operator configuration, process control operations can drain off a portion of the treated solution, then add new wastewater to replace the drained off solution which thereby continually prevents or mitigates the undesirable formation of solids and scaling within the system. Cyclically partially draining treated solution and replacing it with new/untreated wastewater, can keep salt concentrations of the solution in the system within acceptable limits or below scaling points, thereby minimizing, or preventing the buildup of solids on internal system surfaces. Accordingly, the disclosed process can run continuously until all available wastewater is treated, repeatedly achieving critical solution concentrations levels through evaporation then lowering concentration levels by discharging treated solution.

In accordance with one embodiment, in finding a critical point and predicting impending precipitation, a greater weight can be placed on the temperature of the solution undergoing treatment. As stated above, the higher the temperature the solution can and does reach, the higher concentration of salt, and in addition the more salt the solution can suspend or hold. Many hours of testing have proven that the temperature of a specific solution can be used as a main factor in determining the critical point. If the solution under treatment has a minimal salt level at the start of the evaporation phase, the solution will not and cannot rise noticeably above the boiling point/temperature of water (i.e., 100° C.). As water evaporates from the solution thereby increasing salt concentration levels, the solution will increase above water's boiling point, where the liquid solution (albeit with a higher viscosity or a thicker mixture) will require a higher temperature to boil. It has been determined using the disclosed system that as the temperature of the solution rises above 100° C. and how fast the temperature rises when it gets above 100° C. for a given amount of heat input, will indicate that the solution is getting closer to reaching its critical point.

It has also been determined dial as the solution gets concentrated, denser, and closer to its saturation and scaling point, the boiling temperature of the solution will rise to as high as 109° C. and when this occurs the system using various input parameters (temperature, BTU input, solution volume, flow rate, etc.) to predict a time when significant scaling will begin to occur. It can be advantageous to keep the solution homogenous in temperature and consistency through adequate agitation such that the average temperature of the solution can be measured to withing one tenth of a degree Fahrenheit. Procuring precise accurate temperature readings allows the system to operate at improved efficiency by achieving the highest solution densities possible or a solution with maximum solute yet avoiding significant harmful scaling thereby mitigating the possibility of system fouling.

It is desirable that the system can accurately determine the temperature of the solution under treatment to within one tenth (1/10) of a degree Fahrenheit. Such accuracy has proven valuable in maximizing system efficiency. All data acquired by the controller can be time stamped and continuously reviewed (from past batch processing) to accurately predict when the solution has reached a critical state. For example, temperature change data, temperature rate change data and corresponding precipitation rates and concentration data obtained from previously processed batches can be utilized to accurately predict if a solution being processed has reached its critical state.

Precision solution temperature data can allow for precise control, and where the solution can be discharged just prior to significant scaling. Likewise, the controller can accept and process data and correspondingly control system components based on minute changes in a solution's average temperature. For example, the amount of heat being added to the solution can be reduced or throttled such as not to overshoot a solution's critical state. Tightly and accurately controlling the temperature of the solution can provide optimum solution discharge intervals where each solution is discharged prior to the occurrence of detrimental scaling, ensuring each batch of solution never reaches excess saturation levels and/or remains slightly below critical concentration levels. Failure backup control processes can be programed into the controller. For example, a chloride sensor can be used to not only enhance the accuracy of detecting impending scaling, but such sensor data can also be utilized to detect other system failures of inaccuracies like when a temperature sensor fails or loses accuracy. When the system estimates a temperature/saturation curve to predict a scaling point, data from secondary sensors such as a chloride sensor can be utilized to modify or adjust the estimated temperature/saturation curve and critical point base on the amount of chloride ions in the solution. Data from various secondary sensors can be utilized to better predict and detect a solution's critical state even if the solution under treatment has contents much different from previous batches.

Figure 1:
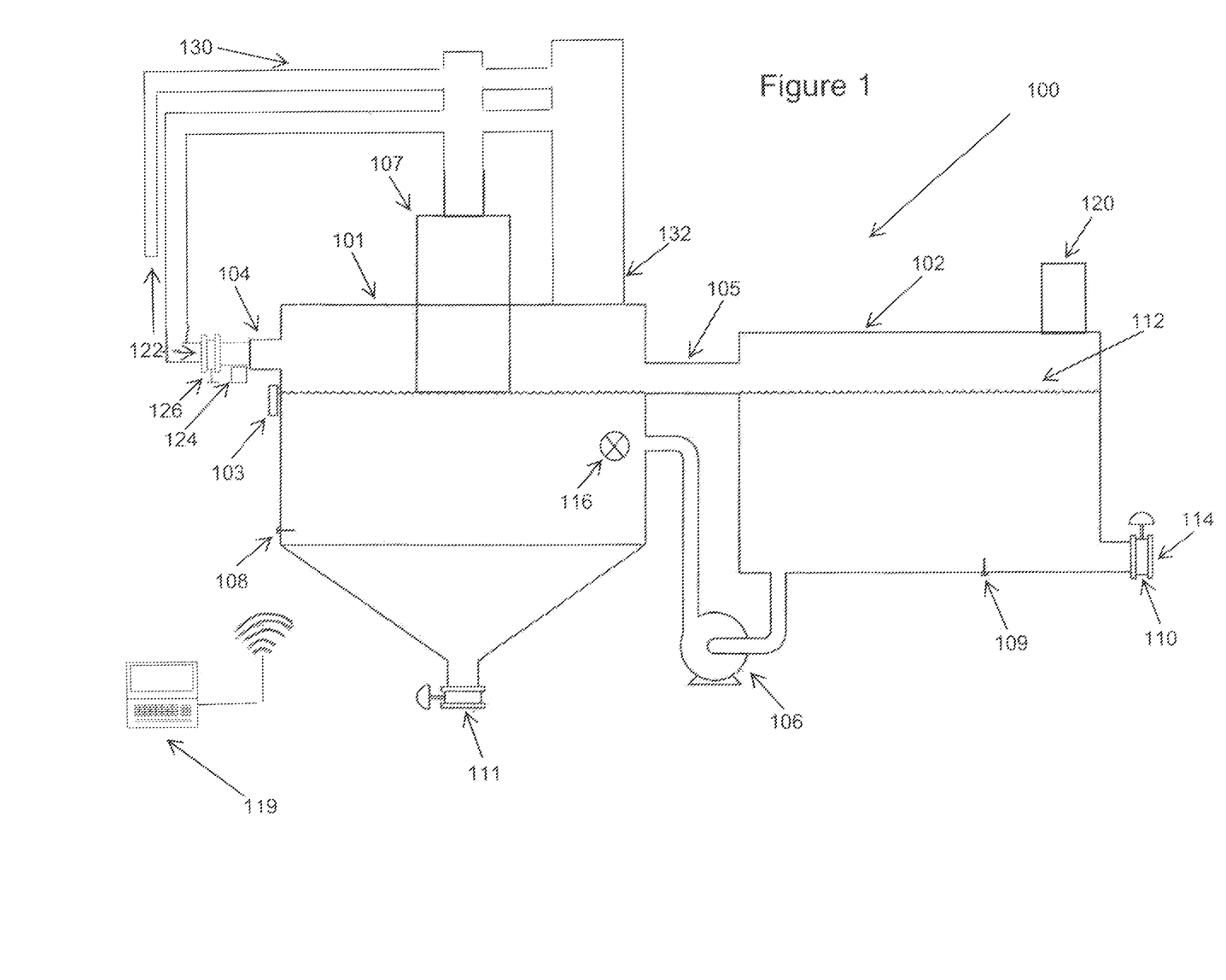
FIG. 1 is a block diagram depicting wastewater treatment system embodiments and various components and/or modules that can be utilized to implement such a treatment system.

Referring to FIG. 1 a block diagram of the disclosed system is provided. Treatment system 100 can treat a solution 112 and can include an evaporation vessel 101 (EV) a dilution vessel 102 (DV), solution properties sensors 103, inlet port 104, inlet valve 126, inlet sensors 124, transfer conduit 105, circulation pump 106, heat source 107, exhaust port 132, EV sensors 108, DV sensors 109, discharge valve 110, DV discharge port 114, EV discharge port 111, mixer/agitator 116, processor or controller 119, preheat/recovery module 130, and injection port/module 120.

EV 101 and DV 102 can be manufactured of corrosion resistant materials such as high temperature fiberglass, stainless steel, and/or titanium and of adequate size to hold and process a specified flow rate of wastewater at a specified temperature and concentration. The size of the EV 101 can generally be based on volume of wastewater to be treated per hour, the temperature and salinity of the incoming wastewater 122 and the amount of heat the heat source 107 can transfer to a batch of solution 112 over a specified period of time. It is preferred that EV 101 has an internal mixing means such as mixer agitator to create sufficient solution turbulence to maximize solution solubility and also maximize heat transfer to the solution 112. In addition, it is preferred that at lease the lower portion of EV 101 have no corners and sloped walls, and/or be of a conical in shape such that the EV 101 can be substantially drained or evacuated of any settling solids where smooth surfaces and gravity can assist in removing any solids or thick slurry that may build up on the interior walls of the EV 101 via EV discharge valve 111.

Initially inlet valve 126 can be opened allowing wastewater 122 to enter the system 100 via inlet port 104. In some embodiments prior to wastewater 122 entering inlet port 104 wastewater 122 can be preheated by absorbing heat that is being emitted by system 100. For example, a preheat/recovery module 130 can be a heat exchanger placed in the exhaust or flue of heat source 107 and/or in the vapor exhaust port 132 such that the incoming wastewater can absorb heat that is leaving system 100 via these ports thereby increasing the temperature of wastewater before it enters the EV 101.

In some embodiments heat source 107 can utilize submerged combustion technology which does not operate using the same principles as gas to liquid heal exchanges utilized by typical evaporators as such principles can be better defined by steam tables. When submerged combustion technology is utilized it may not be feasible to capture/recapture heat as if recapture causes too large of a temperature and/or pressure drop in the exhaust port 132 the vapor will rapidly condense prior to being removed from the system 100. Likewise, it is desirable to minimize any Hue restrictions which can cause pressure changes in the exhaust plume as which can cause the escaping vapor to condense and "reenter" or fall back into solution 110.

Input port sensors 124 proximate to the inlet port 104 can detect various parameters of the incoming wastewater 122.

Often incoming wastewater can have high pH imbalances, a high amount of total dissolved solids, a high amount of total suspended solids, or chemicals that can be easily and quickly removed and/or converted to a less hazardous compound. Based on the parameters of the incoming wastewater detected by sensors 124, injection port/module 120 under the direction of controller 119 can conduct one or more pretreatment processes such as adding, specific chemicals or "seeds" to the solution 112 based on such detected parameters which can improve the efficiently of the treatment process.

For example, if incoming wastewater 122 has high levels of salts such as calcium sulfate, wastewater 122 can be difficult to efficiently treat solely with an evaporative process because such wastewater is already saturated or near saturation levels and thus at its scaling point. In accordance with some embodiments if incoming wastewater is near saturation levels, per an operator's configuration, injection port/module 120 can inject salt "suspension seeds" where a seed can have an affinity for a particular sail, such that one or more salt compounds will attach to these seeds and thus increase the ability of solution 112 to suspend salts. Thus, an operator can configure controller 119 to inject pretreatment solutions to increase system efficiency based in properties of the incoming wastewater. However, seeding solution 112 to control crystallization, precipitation, and scaling points and/or make treatment more determinable or detectable is only one factor that can be utilized to prevent scaling of system 100 as system 100 provides an operator with many different tools and controls to control scaling in system 100.

For example, different dispersants can be added to the solution to control scaling or to control precipitation of various compounds such as salts. A dispersant or a dispersing agent generally is a substance, typically a surfactant, that can be added to a suspension of solids or panicles in a liquid to improve the separation of the particles which prevents or retards the settling, precipitation and/or clumping or solids.

Other non-evaporation type extraction and/or treatment processes such as bio-electro-chemical, bio-mineralization, bio-sorbent, microbial desalination cell, and deposition processes can be utilized in combination or conjunction with the disclosed evaporation embodiments as well as other extraction techniques. For example, oxygen scavengers, scale inhibitors, or other agents such as carbon dioxide can be injected into the brine solution to precipitate or draw certain chemicals from the solution. In addition, capacitive deionization, ultrasonic treatment and/or a gas hydrate process could be utilized to change crystallization properties of the solution as desired. If corrosion is a concern the system 100 can implement a deaeration process to remove non-condensable gases such as carbon dioxide and oxygen. The removal of such gasses can significantly reduce the corrosive effects inherent in evaporative processing.

Controller 110 can also accept data from solution parameter sensor 103 and control the amount of wastewater 122 that is input to the system 100 and also allow controller 119 to ensure that a constant level of solution 112 is maintained EV 101 and DV 102 can be in constant fluid communication with one another via transfer conduit 105, such that a single level sensor 103 can be utilized detect fluid levels in both the EV 101 and DV 102 during operational cycles. In some embodiments sensor 103 can be located proximate to input port. 104 and can be mechanically coupled to inlet valve 126. In some embodiments sensor 103 can be part of a mechanical control system which utilizes one or more floats mechanically attached to a valve actuator where, when the float reaches a defined height the inlet valve 126 is closed preventing additional wastewater from entering the system 100. In some embodiments the operator of the system 100 can set the level of solution 112 as desired either mechanically or via presets of controller 119.

Pump 106 can receive signals from controller 119 and can transfer or move solution 112 on a continuous or periodic basis from EV 101 to DV 102 or vice versa. Pump 106 can move solution 112 such that passes over around or through agitators 116 to increase the seating point of solution 112. Meat source 107 can be managed by controller 119 and can be for example a gas fired burner. Heat source 107 can heal the solution 112 and raise its temperature to a boiling point and maintain a predefined temperature. Such control can be accomplished utilizing a mechanical-type thermostatic controller or control can be achieved via control signal from controller. An operator will typically configure system 100 to reach and maintain a solution temperature at the vaporization point of solution 112. Such a temperature may be above the vaporization point of water based on the environmental parameters, solution make up, solution composition or constituents in the solution 112 and other factors which can be predicted, predetermined and/or determined based on sensor data. In some embodiments, that system can utilize submerged combustion to heat the fluid. If the solution is mainly water, processing temperatures of around 186° F. can be utilized to cause water vaporization. However, when the solution is a sodium chloride brine that is close to its saturation point, the processing temperature will rise and should rise to near 196.4° F. for efficient vaporization to occur. In one embodiment the vessels and conduits can be manufactured from a high temperature fiberglass which is rated for operating temperature of at least up to 220° F.

Sensors 108 and 109 can include temperature, splash, agitation, density, and viscosity sensors to name a few, that controller 119 can utilize to control the treatment process according to predefined operator configurations, for example, an evaporation profile can be set such that solution 112 maintains an ideal temperature during different time periods of an evaporation cycle or based on the consistency of the solution changing. System 100 can utilize submerged combustion technology where hot combustion gasses are injected directly into the solution or below the surface of solution 112 or at the lower portion of EV 101 such that the combustion gases are in direct contact with solution 112. Such a configuration can eliminate the need for a large intermediator type heat exchanger which would be susceptible to corrosion, cracking, scaling and eventually fouling.

In such a configuration the release of a high-volume of hot combustion gasses are injected into the bottom of EV 101 and quickly rise to the top surface of solution 112. As streams of gas rise up through agitator plates, the gas will break up into thousands of small bubbles and generate a large amount of turbulence in solution 112. Depending on the solution to be treated or the application, agitator plates can have larger or smaller holes which can increase the surface area of gas in direct contact with the solution and smaller holes cart create a buildup of gas below the agitator plate to increase the contact time and thus increase heat transfer efficiency.

In such a configuration solution turbulence will start at the bottom of solution 112 and thus can agitate any denser solution and/or heavier particles which may have settled into the lower area of EV 101. In some embodiments an agitator can be a series of vertically stacked diverter plates with various hole patterns such that the rising/moving combustion gases will agitate solution 112 as gas travels around and through various obstacles, which breaks the gasses into ever smaller bubbles heating and agitating the solution 112 further raising the solubility point of solution 112.

Although, it is desirable to avoid destructive solid formations generally, solids may be carried into the EV 101 with the incoming wastewater 122 and simply fall to the bottom off EV 101 or may precipitate out without regard for the solution's solubility point. Thus, the bottom of EV 101 can be sloped like a hopper or have a conical or funnel shape thereby allowing solids that are contained in, or precipitate out of solution 112 to settle and such that they can be easily evacuated via discharge valve 111 based on sensor detection data or during predefined periods both as defined by an operator. The EV 101 and DV 102 are shown as two separate vessels or tanks; however, the disclosed system could be embodied as a single vessel with a separator or a screen that forms two separate compartments in the single vessel.

Before or when solids begin to precipitate and scale, controller 119 can activate discharge valve 110 to remove at least a portion of treated solution 112 from discharge port 114 (during a discharge cycle) and then controller 119 can open fill/inlet valve 126 allowing a new batch of wastewater to flow into the system 100 (during a fill cycle) bringing solution 112 back to the desired operating capacity and then restart the evaporation cycle. During batch processing operations, controller 119 can accept and store data from a plurality of sensors 108 and 109 and process such data according to an operator configured, predetermined algorithm. An operator can configure or tailor a treatment process using a graphical user interface (GUI) to program controller 119. During a programming operation the GUI can display various selectable or adjustable control parameters for each operational stage from start to finish to simplify the programming process. Based on operator provided control parameters, controller 119 can execute one or more predetermined algorithms including artificial intelligence algorithms to determine when and what control signals are to be sent to a particular component or components of the system 100. For example, if controller 119 determines that harmful scaling occurred on a previous batch, and artificial intelligence algorithm being programed with optimum goals, and running within controller can change various control setting to improve system performance As stated above, based on current and past data controller 119 can activate discharge valve 110 and evacuate solution 112 prior to scaling or the formation of solids in the system 100 to avoid conditions that would have an adverse effect on short term and long-term system performance.

Controller 119 can initiate and continue an evaporative process on solution 112 by activating heat source 107 and running circulation pump 106 while salt concentrations in solution 112 stay below conditions as set by the operator. As stated above, controller 119 can be programmed such that when data from sensors 103, 108, 109 and 124 indicate possible or impending scaling conditions, controller can activate a valve at discharge port 114 to drain a portion of solution 112. It is preferred that the drain cycle be initiated just prior to when a significant amount of solids such as salt crystals begin to form on interior system surfaces. Controller 119 can be configured to execute process control algorithms that significantly reduce, and often eliminate the formation of noticeable amounts of solids, and most importantly solids that form a fight bond to interior surfaces during the processing of each batch.

Controlling the prevention of, or the amount of scaling will mitigate heat transfer problems, port blockage issues, and valve operation issues all which can eventually lead to system fouling. The forced circulation design can continually move and thus agitate the solution under treatment 112 to increase or maximize the amount of solids that solution 122 will hold or suspend at its critical state and/or prior to discharged, as it has been determined that keeping the solution and its dissolved constituents in motion hinders their ability to precipitate.

Controller 119 can monitor data from various sensor outputs and based on the detection of impending scaling or trace amounts of scaling, which can be learned from previous batch treatments and the associated conditions detected. Controller 119 can utilize artificial intelligence algorithms and past data to learn and better predict scaling points. Such a learning process can be utilized to tightly control each phase of the process thereby substantially eliminating solid formation on interior surfaces of system 100. System 100 can be effectively utilized to process wastewater generated by many different processes and many different industries. However, system 100 has been shown to work particularly well when appreciable amounts of different salts are present in the wastewater to be processed. According to one operator set up, treatment of a current hatch of solution is considered complete when the solution reaches a critical point, near a solutions solubility point and/or close to its saturation point. Alternately described when solution 112 reaches a substantially maximum concentration level of suspended salts based on all precipitation reducing or solubility increase factor all which mitigate harmful scaling, then at least a portion of the salt laden solution is then removed or discharged from the treatment system 100. Controller 119 can utilize a wide variety of data to predict, detect and/or determine a critical state of the solution which occurs just prior to the substantial formation of solids withing the system. When a critical state is detected controller 119 can lower the concentration of solids in solution 112 by initiating a discharge cycle, then a fill cycle to replace the amount of solution 112 discharged with lower density wastewater to be processed.

It can be appreciated that the frequency of each drain cycle can be dependent on what elements, chemicals and compositions concentrations are incoming, as well as the temperature, temperature change rate, pressure, agitation, pretreatment performed (such as seeding). pH of the solution, and evaporation rate to name a few. For example, if incoming wastewater has high salt contents, when uniform heat is added during the evaporation cycle, the solution may spend a long time at temperatures degrees above the boiling point of water, then quickly jump to a higher temperature and then level off or not increase even though the amount of heat input to the system has remained constant. Such fluctuation in solution temperature can be detected and utilized to determine the critical state.

As stated above the GUI used to program controller 119 is user friendly as an operator can set the critical state detection parameters based on many sensor inputs such as multiple temperature or temperature change parameters, concentration levels viscosity, etc. which will activate a drain cycle. Sensors 108 and 109 can provide accurate time stamped data that can be utilized by controller 119 to determine a critical state of solution 112. Sensors 108 and 109 can also provide molecular based data such as salt concentrations, electrolytic properties, metal concentrations and various chemical concentrations of solution 100.

By periodically draining solution 100 before substantial oversaturation, crystallization and thus scaling occurs, system 100 can operate more efficiently with less maintenance and greater longevity than current state of the art evaporative treatment systems. By precisely detecting a critical state, particularly in critical locations within system 100, and not exceeding critical points, scaling withing system 100 can be precisely controlled and substantially eliminated when the system is properly configured by an operator. Known prior art systems often continue the evaporative process to full saturation or past a point where saturation occurs at least in one or more locations, within such a process eventually causes scaling leading to system inefficiencies, fouling and eventually failure.

The disclosed system 100 works particularly well in the treatment of wastewater having high solid contents such as wastewater that is produced front landfill leachate, oil & gas production. RO rejection water, flue gas desulfurization (FGD) wastewater and/or other heavy brines. System 100 provides a substantial turndown ratio and achieves consistent, uniform solution flow, homogenous solution temperatures throughout, and can achieve high solution velocity and turbulence to create high shear stress on particles attempting to adhere to various surfaces within system 100. Such high shear stresses provide a self-cleaning mechanism to prevent and often remove unwanted scaling that may occur. An operator can configure the controller 119 to operate circulation pump 106 at higher pressures and flows to increase the scaling point and/or to minimize scaling to greatly reduce the likelihood of failure or irreversibly fouling, inefficiencies that can lead to non-compliance with governmental regulations.

According to the disclosed embodiments solution 112 can be drained off and removed from system 100 after controller 119 has detected that the rate of the crystallization is greater than the rate of dissolution, or alternately described, just prior in time to when crystallization rales significantly exceed crystal dissolution rates. Thus, as dissolved salts reach high enough concentrations such that the solution can no longer hold or suspend the dissolved salts and crystallization rates are increasing discharge valve can be opened to drain off a predetermined amount of solution. Accordingly, it can be desirable for a system operator to configure controller 119 to discharge a portion of solution 112 when the solution's salt concentrations reach a predetermined level, below where crystals strongly attach and harden on interior surf aces of system 100.

Regarding predicting and detecting where a critical point for a particular batch of solution will occur, controller 119 can assimilate many factors. The rate at which a solid will dissolve in a solution is often referred to as a solubility rate, which depends on many factors but primarily on temperature. The rate of crystallization depends generally on the concentration of the solute available at surfaces of forming crystal. To reduce crystallization rates, solution 112 can be continuously pumped between EV 101 and DV 102 thereby agitating the solution and slowing crystallization and crustal growth giving sensors 108 and 109 and controller 119 additional time to find an optimum critical state just prior to rapid assembly of crystals. Such continuous movement also maximized the net dissolving rate of the salts in the solution and mixes lower concentrations area and incoming replacement solution with higher density solution areas.

When evaporating a weak brine solution, the temperature of the solution may top of at the boiling point of water however as water evaporates the solution's boiling point will start to rise until it reaches the solutions boiling point where it will again top out until the solution reaches its solubility limit where the temperature will again rise. Once the solubility limit of a substance is surpassed, scaling or deposition will take place. Each ionic compound has its own solubility limit under a set of circumstances, which is the maximum amount of the compound that can or will remain in solution. Such a phenomenon can be defined as the solubility product constant, which is a function of temperature, pressure, pH, and agitation, where slight variations in any of these properties can shift the solubility point and increase solute concentrations or alternately decrease and cause scaling. A brine's solubility point can be defined as a percent % salt by weight. Many brines will reach a solubility point of approximately 75% salt content by weight. The relationship between a solubility point and a boiling point for many different salts and salt concentrations can be defined utilizing a solubility curve for a specific atmospheric pressure.

The control algorithm executed by controller 110 can consider and maximize all functions and features that may increase the solubility point of solution 112 including How rates, turbulence, homogenous mixing, agents, temperature, pH, and pressure to obtain an optimum critical state. Using the turbulence factor, temperature, pressure, evaporation rate, pH, viscosity, crystal sizes, crystal compositions, crystal concentrations, chemical ratios, and proportions of solution composition generally, controller 119 can accurately determine a critical solution state occurring before a solubility point is reached.

In accordance with one embodiment the treatment system will discharge at least a portion of the solution being treated when the solution reaches a critical salt concentration level as is determined by using data from one or more sensors. After some of the treated solution is drained from system 100, the fill valve 126 can be opened where the EV 101 is again filled to a desired level which will lower solution concentrations where at all times solution 112 can be kept from harmful scaling.

To determine salt concentration of solution 112 a contacting or toroidal conductivity sensor can be utilized. The solutions ability to conduct electric current (conductivity) is one factor that can be utilized to estimate salt concentrations and the state of solution 112 with regards to its critical state. Such a sensor is one more example of a component that can get coated in a typical treatment system where coating build up on such sensors can cause measurement inaccuracy and sometimes failure. By accurately monitoring the salt concentrations to substantially eliminate crystal formation system can avoid inefficient heat transfer, port blockage, corrosion, and sensor fouling to name a few.

In operating the disclosed system is has been determined that when a brine solution contacts a dry surface, crystals will often form a tight hard to break chemical bond on such dry surfaces. The integrity of the bond can however depend on the type of material of the dry surface as most materials are rough at a microscopic level which allows a solute to effectively grip the material when dry. When crystals create such a molecular bond, cleaning such crystals from the interior system becomes very difficult as this adhesion or bond can be difficult to break. Crystals are rigid structures, and, in some embodiments, a flexible material can be utilized like fiberglass such that bombarding such surfaces with ultrasonic vibrations will dislodge such solids for removal Notwithstanding, when a solution hits a dry surface, at the boundary layer the solution can undergo many different changes which trigger such adhesion. For example, the boundary layer of a solution can induce instabilities such as slowing solution movement (less agitation) create temperature and pressure changes and create density changes and molecular changes all which can cause solute to precipitate and molecularly grip the dry surface.

To minimize or eliminate dry surfaces, injection port/module 120 can include spray nozzles located at various positions within the system 100 (exact placement not shown) to spray or mist various interior surfaces of system 100 which are subject to drying. Thus, injection module 120 can ensure that, a thin layer of water (or other non-stick agent) is present on all interior surfaces during operation to thereby prevent or greatly the adhesion of or adhesion strength of solids so such surfaces. During the evaporation cycle, surfaces of the combustion chamber 107 can reach several hundred degrees Fahrenheit. Thus, combustion chamber surfaces which are above the solution level at any time will tend to dry quickly due to the effects of gravity and heat on the solution covering such surfaces.

It can be appreciated that any surface particularly surfaces of heat source 107 exposed to air (i.e., not covered by solution) at any given time, (depending on the solution) will be subjected to drying. Accordingly, injection module 120 can apply a wetting mist to any and all interior surface which are subjected to drying to minimize or eliminate significant scaling on such surfaces by keeping them wet. It can be appreciated that, many interior system surfaces will not require the application of such a protective non-stick layer as the vapor created in the evaporation vessel 101 will lightly condense on many interior surfaces of EV 101 and DV 102 thereby providing a non-stick coaling on such surfaces.

As stated above, a submerged heat source can be utilized in some embodiments to inject hot combustion gas bubbles into solution 112 where such bubble will burst when they reach the surface of solution 112. When the amount of gas injected reaches higher levels, such bursting can cause excessive splashing of solution 112 on internal surfaces. Such splashing can cause or increase the chances of scaling on surfaces that under normal conditions would never come into contact with solution 112. Thus, based on sensor data, controller 119 can throttle or control beat source 107 and the amount/volume and pressure of gas injection to minimize splashing of solution 112 within system 100. For example, one more measure controller 119 can provide to minimize scaling is to monitor, control and substantially prevent solution splashing within EV 101.

Salt crystal build-up on interior surfaces often causes localized corrosion characterized by oxidation-based erosion at discrete locations in the system. Such corrosion/erosion is responsible for the formation of pits, cracks, and grooves in critical areas of treatment systems. When properly configured controller 119 can substantially eliminate destructive internal corrosion cause by salt crystal formation by tightly controlling when to terminate the evaporation cycle to reduce outgassing and thus corrosion type fouling.

As described, the disclosed system and method can substantially minimize and can virtually eliminate salt crystal formations withing the system by emptying the solution when near full salt saturation of the solution is achieved. The disclosed embodiments can detect a near 100% saturated solution, then unload a batch of solution and automatically load a new batch into the system, thereby keeping suspended salt concentrations below a predetermined level.

Controller 119 can be referred to as a process control system (PCS), or an industrial control system (ICS). Controller 119 can control each phase or each cycle of the treatment process differently for each batch according to user/operator settings. For example, solution temperature, cycle time, discharge amount etc., may vary for each batch if the controller 119 determines that based on sensor data different control measures or a change in control parameters will provide better results or will process a batch most efficiently. For example, if controller 119 detects that incoming wastewater 122 has different properties that a previous batch of wastewater, controller 119 can load and execute a different algorithm or execute the same algorithm based on different data points. Controller 19 can also store data on each treated batch regarding for example scaling occurrences in relationship to a heating or temperature profile, and this data can be utilized to improve future control processes. Other data such as batch time, chemicals processed, chemical or compound concentrations accepted and amount of water discharges for each batch can be stored and analyzed and can also be utilized to evidence compliance with all applicable regulations. Controller 119 can also utilize historical operational data for improving system performance and for troubleshooting and learning scaling minimization methods. Many types of process control systems could be implemented with the disclosed embodiments including a supervisory control and data acquisition (SCADA) system, one or more programmable logic controllers (PLC), or even a distributed control system (DCS), to gather information, make control decisions and to store data obtained during each phase of a treatment process.

Controller 119 can be implemented utilizing discrete programmable logic modules to receive relatively few sensor inputs from primary transducers to produce and send the desired control signals to for example heat source 107, valves 111 and 126 and pump 106. Control signals and data from sensors 103, 108, and 109 can be communicate via a digital network protocol such as Internet Protocol (IP), wireless IP or Bluetooth format which can provide diagnostics and fail-safe control and also allow real time monitoring and control system 100 from a remote location. Thus, sensors 103, 108 and 109 can include temperature, solution level, vessel pressure, flow rate, wastewater content, solution content, discharged contents, solution density, turbidity, acidity, evaporation rate, solution conductivity, and saturation level can all be communicated wirelessly utilizing one or many digital networking protocols.

Many additional sensor types can also be utilized to gather data on various aspects of the treatment process and such data can be acquired by controller 119 and used in executing process control algorithms to control active components of system 100 such as valves, burners, pumps, and other active components. For example, a salinity sensor can be placed in contact with solution 112 under treatment to monitor the percentage of salinity of solution 112 as it is being treated. Discharge valves 110 and 111 can be located at the bottom of the DV 101 and EV 102 which can be controlled by controller 119. When solution 112 reaches the predetermined critical point for example as determined by a salt density level, controller 119 can open discharge valve 110 allowing a predetermined amount of treated solution 112 to be discharged from system 100. Controller 119 via data from sensors 124, 103, 108 and 109 and based on an operator configuration can close discharge valves 110 and 111, open input valve 126 to refill system 100 with a new batch of untreated wastewater. Next controller 119 can turn on circulation pump 106 to mix the newly added wastewater 122 with solution 112 remaining in vessels 101 and 102, then activate heat source 107 and repeat the evaporative treatment process for each batch until all of the wastewater is treated.

In some embodiments, acceptable levels of emissions based on governmental regulations can be programmed into controller 119 and controller 119 can verify that system emissions and operations compliant, with such regulations. For example, controller 119 can compare data acquired on incoming wastewater 122, drained solution, vapor emissions, etc., and record how each incoming contaminant is being processed and/or how and what is disposed by system 100. Alternately, controller 119 can determine if certain levels of contaminates being created or emitted exceed various regulations and can change the control processes to bring system 100 into compliance. All industries who generate wastewater with heavy metals and salts or "contaminates" exceeding levels prohibit by their local sewer providers can make effective use of the disclosed wastewater treatment system.

During operation, the EV 101 and DV 102 can be filled to a predetermined level with incoming wastewater 122. The solution level can be maintained and monitored by a water level control system according to solution level sensor 103. Wastewater 122 to be treated or processed can enter through inlet port 104 which is in communication with EV 101 and DV 102 and will reach an equilibrium level in system 100 via one or more conduits. Circulation pump 106 can continuously circulate solution 112 between EV 101 and DV 102 via the one or more conduits. Heat source 107 can be a burner/heat exchanger arrangement located within the EV 102 or can be a remotely located combustion chamber that where heat is moved into the EV 102 via one or more conduits. Heat source 107 cart be fueled by renewable energy such as solar or wind or by fossil fuels, or other known sources. After vessels (101 and 102) are filled, controller 119 can activate an evaporation cycles and throttled heat source 107 to control the temperature and temperature increase profile of solution 112 until a sufficient amount of solute (water) changes into a vapor form and exits system 100 via exhaust port 132 until solution 112 reaches its critical state.

Sensors 103 and 109 can include at least one temperature type sensor such as a thermocouple to monitor the temperature of solution 112 during the evaporation cycle. Sensors 103 and 109 can also include a density and salinity meter positioned in contact with solution 112. Discharge valves 110 and 111 can be located at one of more locations on the system 100 such as on each vessel (101 & 102) to discharge at least a portion of solution 112 after it has been sufficiently condensed or has reached is critical state.

Sensors 103, 108 and 109 can also include a water level sensor and/or a water level controller that can load and maintain a relatively consistent solution level throughout the evaporation cycle. Once the level/amount of solution has reached an acceptable level or an initial fill has been completed, controller 119 can activate circulation pump to move solution 112 about the system 100 at a predetermined flow rate based on the solutions consistence thereby providing the desired agitation based on the properties of solution 112. EV 101 and DV 102 can be in fluid communication via multiple conduits, where circulation pump 106 can create and maintain solution flow from DV 101 to EV 102 and back. The system 100 can provide a closed loop system where solution 112 flows past/through mixers/agitators as it is moves from tank to tank.

Sensors 109 can include a temperature sensor that can accurately detect when the temperature of solution 112 rises above the boiling point of pure water, according to applicable boiling curves. Such a detected temperature above the boiling point of water can be an indication of the salt concentration level in solution 112 and thus impending scaling where such a detected temperature in conjunction with other data can be used to detect a critical state and start the drain cycle. In some embodiments, other sensor data or a combination of sensor data such as viscosity, density, conductivity, and salinity data can be utilized to improve accuracy of critical state detection.

As can be appreciated, incoming wastewater 122 will have a lower percentage of soluble constituents, such as salts, and when added to and mixed with the solution 100, will salt concentrations and/or reduce the percentage of water-soluble constituents in solution 112. The disclosed process is designed to allow for water soluble components to reach the maximum level in solution 112 as possible, without causing scaling. If sealing should occur because of how an operator has configured the controller 119, such a scaling period would occur only for a very short or time, due to over saturation or supersaturation of solution 112. In some embodiments, during the evaporation cycle a small amount of solid laden solution (mostly solids that have settled to the bottom of the tank) can be drained from the bottom of EV 101 and DV 102 on a periodic basis or if or when the presence of an appreciable amount of solids is detected at the bottom of the respective vessel. By monitoring the temperature and density/salinity of solution 112, controller 119 can estimate the average percentage of salts present in solution 112 at any given time and increase flow and decrease heat input such that the system does not scale and overshoot an optimum critical state or a state where a maximum solute suspension is reached.

The disclosed embodiments can operate as a water evaporation system which keeps the solution under treatment homogenous such that the DV 102 contains essentially the same solution as EV 101, where only DV 102 is periodically drained after the solution 112 is brought to its critical state (for example where the solution 112 is at a state just under one-hundred percent saturation regarding one or more compounds suspended in solution 112.

The relative size of each component of system 100 (such as heat source and vessel capacity) has been determined where the disclosed system can be proportionally scaled based on the volume of wastewater to be processed for a given time period. The overall processing capacity can be calculated based on the average percentage of suspended compounds found in incoming wastewater, sustainable operational temperatures, and a desired time between cycles. In configuring controller 119 it is preferred to achieve maximum salt concentration allowed in the evaporator without allowing solids to precipitate out of the solution before discharging at least a portion of the treated solution. When properly configured, the disclosed embodiments can virtually eliminate the formation or possibility of formation of salt crystal by not allowing extended evaporation time such that salts and other chemicals remain suspended in solution 112 during the entire evaporation cycle and the entire discharge cycle.

Figure 2:
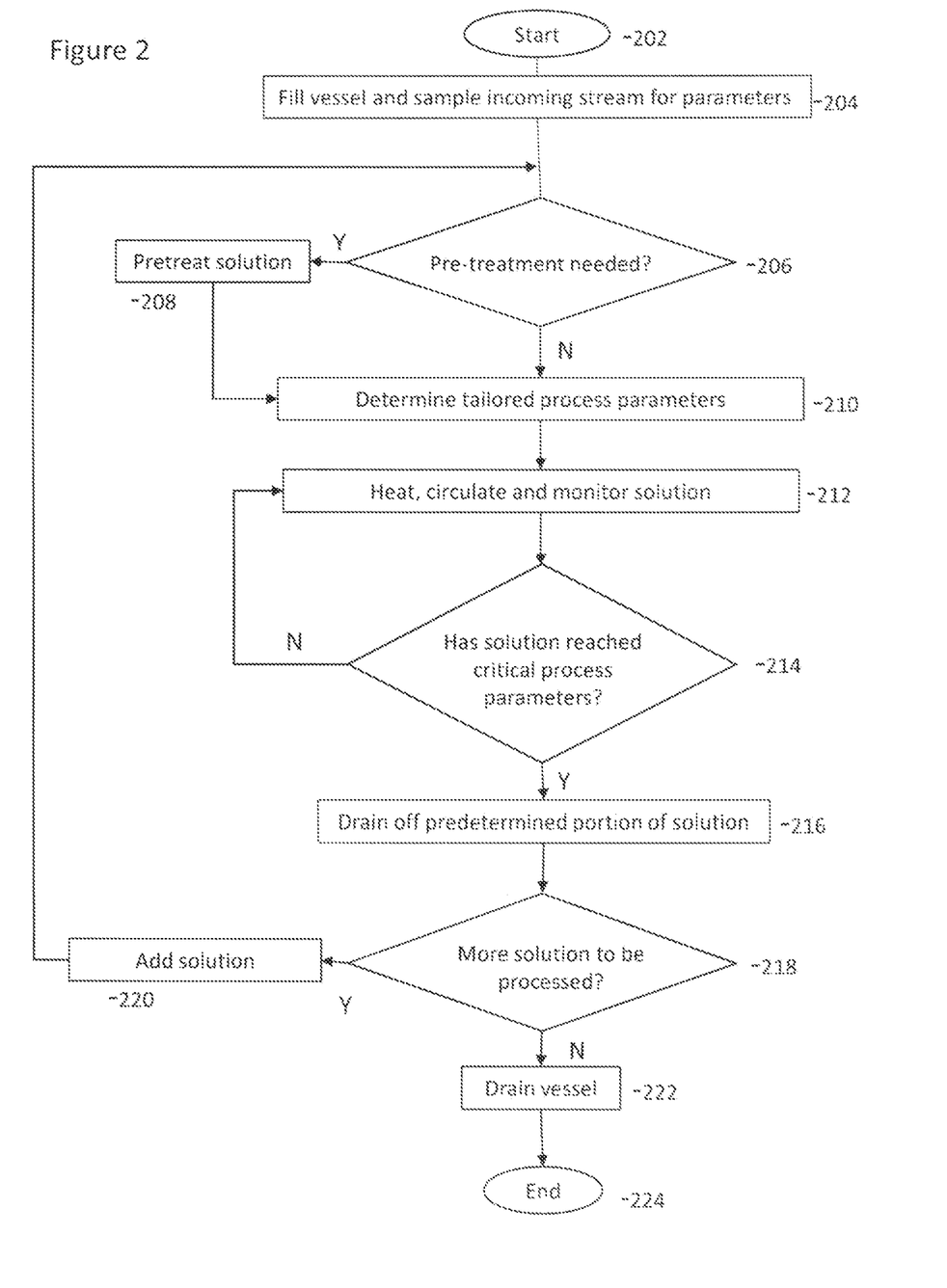
FIG. 2 is a flow diagram illustrating one or more methods of operating the disclosed system.

Referring to FIG. 2 a basic flow diagram 200 of the disclosed arrangements is depicted. Flow diagram 200 illustrates how certain processes and elements of the present disclosure can be implemented and can work together to achieve novel results. The process can start at block 202 and proceed to block 204 where a wastewater solution can enter the treatment system, filling a vessel or vessels to a predetermined level with wastewater to be treated. As part of the fill cycle the incoming wastewater can be sampled via sensors to determine specific properties or parameters of the incoming wastewater, such as pH, solute types, solute levels, temperature, or any specific properties such as chemical composition of the incoming wastewater. Such data can be utilized to more efficiently treat or implement a best treatment process for the wastewater. Sensors cast be located such that they can accurately detect such properties of incoming wastewater where such data cast be utilized by a controller to control processing of the wastewater.

As illustrated in block 206, it can be determined if it is desirable to perform one or more pretreat meets to the incoming wastewater. If pretreatment can make the treatment process more efficient then as depicted by block 208 the solution can undergo pretreated. For example, when certain salts are detected, a specific seeding or binding agent that raises the solubility point can be added allowing the solution to suspend more solute. In another example, an agent can be added that will quickly precipitate out certain chemicals or gasses which can either settle to the bottom of a vessel and be evacuated via a discharge valve or can escape through the exhaust stack. Any one of such pretreatments can increase the efficiently of the subsequent evaporative cycle.

As illustrated by block 210 a tailored treatment process can be determined for the solution within the system based on how the controller is configured to operate based on sensor data and a pretreatment process (if any). One aspect of the tailored treatment process can be defining one or more critical measurement levels and resulting control actions to be taken when such levels are detected. Another aspect can be defining secondary parameters and resulting control actions and control action to be taken when various critical levels and secondary parameters are detected. As illustrated at block 212 the solution can be heated and circulated or agitated and monitored for critical parameters. Critical parameter levels can include a temperature, a temperature increase, a rate of temperature change, conductivity, viscosity and an any other data the indicates if or when scaling has or will occur. In some embodiments internal or external conduits can be configured such that the solution enters a vessel at an angle other than 90 degrees or at a tangential angle, which will cause the solution to swirl or vortex increasing solute concentrations of a solution that has reached its critical state.

As depicted by block 214 it can be determined if the solution has various levels or has certain characteristics and has thus reached a critical state as predefined by an operator. If the solution has not reached such parameters, the process can return to block 212 and continue to heat, agitate, and monitor the solution. If the solution under treatment can be drained off as illustrated by block 216. An operator can set the amount or volume of treated solution to be drained or evacuated during each drain cycle based on one or more parameters. As illustrated by block 218 it can be determined if there is more solution to be treated.

If there is more solution to be treated, then additional wastewater can be added to the system and mixed with treated solution remaining in the system thereby diluting the solution and lowering solution concentrations well below the critical state as illustrated by block 220. After dilution, the process can begin another cycle by determining if the added wastewater should be pretreated as depicted in block 206 and the process can proceed to execute another cycle by evaporating, discharging, and refilling as long as there is wastewater to be processed. If at block 218 there is no additional wastewater to be processed, the system can be drained in its entirety, and all drain valves can be opened to clear the solution and any resulting solids, and a cleaning cycle can be commenced as illustrated by block 222. A cleaning cycle can include an acid wash or acid rinse or other descaling operation. The process can end thereafter.

In some embodiments a small amount of solution can be periodically released from the evaporator vessel, then be replaced with wastewater from a feed such that the density or salt levels of the solution under treatment always stay within defined concentration limits. In some configurations an operator can set control parameters such that by volume over 90% of the water in the incoming wastewater is removed by boiling/evaporation, where the remaining 10% of the solution which contains high levels of various salts and heavy metals can be drained and subjected to other downstream treatment processes. For example, the drained solution can be sent to one or a series of lined solar evaporation ponds which will remove the remaining water and create a solid that can be efficiently disposed of. The drained solution can also be sent to a spray dryer to remove the remaining water leaving only solids suitable for disposal at a landfill.

A spray dryer will generally drip the laden/concentrated solution on a wheel spinning at high speed in a hot gas fired chamber thereby instantly evaporating the water portion of the atomize solution allowing the resulting solids to be easily captured. Alternately a steam or mechanically driven forced-circulation crystallizer can be utilized to remove the remaining water from a brine slurry. Such crystallizers provide much faster processing times but are far more expensive than passive solar salt ponds and thus are typically only utilized when a plant have zero discharge requirements, limited space and/or unfavorable environmental conditions for solar ponds.

Other methods for final treatment can include a filter press, electrodialysis reversal (EDR) and/or reverse osmosis (RO) process. A filter press can compress or squeeze remaining liquid out of the brine as a final dewatering treatment process where most final treatment processes can achieve a final waste product having a moisture content below 5%. Other technologies that could be utilized to treat wastewater can include utilizing microbial desalination cells, stepwise deposition and extraction techniques, injecting carbon dioxide gas to amass solids, a gas hydrate process, ultrasonic crystallization processes, and capacitive deionization processes.

In some embodiments, a computer program product is utilized and disclosed that includes a computer readable storage medium including instructions that, when executed by a processor within a controller, the instructions causing the processor to control the processes associated with the methods described. Each process disclosed herein can be implemented with one or more software programs. The software programs described herein may operate on one or more computers, such as personal computer or a client computer, a server, a virtual server, a cloud platform, a mobile device etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (in alterable information stored on writable storage media (e.g., floppy disks within a diskette drive or hard-disk drive); and (iii) information conveyed to a computer by a communications medium, such as through a computer or telephone network including wireless communications and cloud computing. Some embodiments include some code and some information being downloaded from the Internet, intranet or other networks. Such signal-bearing media, when carrying computer-readable instructions that direct the functions of the present disclosure, represent embodiments of the present disclosure. Another factor that can affect crystallization where the net dissolving rate can be increased by stirring agitating or mixing or the solution which essentially prevents, disrupts or slows bonding and thus the build-up of solute on the containment structure.

The disclosed embodiments can be entirely a software embodiment, or an embodiment containing both hardware and software elements. In some embodiments, systems and methods disclosed can be implemented in various layers of software, which can include but are not limited to firmware, resident software, microcode, etc. Furthermore, the embodiments can take the form of a computer program product accessible from a computer-usable or computer-readable medium providing program code for use by or in connection with a computer or any instruction execution system. For the purposes of tins description, a computer-usable or computer readable medium can be any apparatus that can contain, store, communicate, propagate, or transport the program for use by or in connection with the instruction execution system, apparatus, or device.

Input/output or I/O devices (including hut not limited to keyboards, displays, pointing devices, etc.) can be coupled to the system either directly or through intervening I/O controllers. Network adapters can also be coupled to the system to enable the processor to become coupled not only to sensors and control devices but to other data processing systems such as the cloud or storage devices through intervening private or public networks.

It will be apparent to those skilled in the art having the benefit of this disclosure, that the disclosure contemplates methods, systems, and media can effectively execute and provide the above-mentioned features. It is understood that the form of the embodiments shown and described in the detailed description and the drawings are to be taken merely as possible ways to build and utilize the disclosed teachings. It is intended that the following claims be interpreted broadly to embrace all the variations of the example embodiments disclosed.

What is claimed is:

1. An apparatus for batch treatment of a wastewater solution comprising:
    a first vessel coupled to an inlet port adapted to fill the first vessel with a batch of wastewater solution to be treated, and coupled to an outlet port configured to drain at least part of the wastewater solution;
    a heat source coupled to the first vessel and configured to heat the wastewater solution to a predetermined critical state;
    a crystallization rate sensor configured to detect the predetermined critical state of the wastewater solution under treatment, wherein the predetermined critical state of the wastewater solution occurs when a solution's crystallization rate exceeds the solutions redissolution rate; and,
    a batch processing controller coupled to the crystallization rate sensor and configured to determine if a batch of solution under treatment has transitioned to a processed solution, to remove a predetermined portion of the processed solution from the first vessel via the outlet port based on the determination, to retain a portion of the processed solution in the first vessel and configured to add untreated wastewater to the first vessel thereby creating a new batch of wastewater solution to be processed, wherein between the processing of each batch of wastewater solution, at least a portion of the wastewater solution remains in contact with at least a portion of interior surfaces of the first vessel thereby minimizing adhesion of solids to interior surfaces of the first vessel.

2. The apparatus of claim 1, further comprising a nozzle positioned within the first vessel and configured to keep at least a portion of the interior surfaces sufficiently covered with wastewater solution such that adherence of solids to said at least a portion of the interior surfaces is substantially mitigated.

3. The apparatus of claim 1, further comprising a splash sensor coupled to the batch processing controller and configured to detect a predetermined splashing intensity of the wastewater solution under treatment, the batch processing controller configured to control an amount of heat delivered to the wastewater solution under treatment to keep the wastewater solution below the predetermined splashing intensity.

4. The apparatus of claim 1 further comprising;
    a pump coupled to the first vessel configured to move and thereby agitate the wastewater solution under treatment to disrupt formation of crystals in the wastewater solution under treatment.

5. The apparatus of claim 4, wherein the pump is configured to inject a stream of the wastewater solution into the first vessel tangentially to at least one interior surface to cause a swirling vortex of the wastewater solution in the first vessel thereby interfering with a formation of solids in the wastewater solution under treatment within the first vessel.

6. The apparatus of claim 1, wherein the crystallization rate sensor is configured to accept data from one or more of a temperature sensor, a conductivity sensor, a viscosity sensor, a temperature change rate sensor, a scaling sensor, a scaling rate sensor and a chemical composition sensor.

7. The apparatus of claim 1, further comprising:
    a composition sensor configured to detect a molecular composition of the untreated wastewater solution to be added to the first vessel and;
    a pre-treatment module configured to supply a predetermined amount of one or more pretreatment additives to be added to the first vessel based on the detected molecular composition of the untreated wastewater solution.

8. The apparatus of claim 1 wherein the heat source further comprises a submerged combustion system configured to inject hot combustion gasses directly into the wastewater solution under treatment such that at least a portion of the wastewater solution in the first vessel is in direct contact with hot combustion gasses.

9. The apparatus of claim 8, further comprising an agitator plate submergible in the wastewater solution under treatment, above a location where hot combustion gases are injected into the wastewater solution, to restrict a size of combustion gas bubbles which can rise in the wastewater solution thereby increasing a total surface area of hot combustion gas bubbles in contact the wastewater solution.

* * * * *